United States Patent
Singh

(10) Patent No.: US 12,131,329 B2
(45) Date of Patent: Oct. 29, 2024

(54) SECURE CROSS-BLOCKCHAIN ASSET MOVEMENT USING PHOTONIC QUANTUM COMPUTING

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 120 days.

(21) Appl. No.: 18/124,063

(22) Filed: Mar. 21, 2023

(65) Prior Publication Data
US 2024/0320676 A1  Sep. 26, 2024

(51) Int. Cl.
| | |
|---|---|
| G06Q 20/40 | (2012.01) |
| G06Q 20/02 | (2012.01) |
| G06Q 20/38 | (2012.01) |
| G06N 10/00 | (2022.01) |
| G06N 20/00 | (2019.01) |

(52) U.S. Cl.
CPC ......... *G06Q 20/4016* (2013.01); *G06Q 20/02* (2013.01); *G06Q 20/389* (2013.01); *G06N 10/00* (2019.01); *G06N 20/00* (2019.01)

(58) Field of Classification Search
CPC .............. G06Q 20/4016; G06Q 20/02; G06Q 20/389
USPC .......................................................... 705/75
See application file for complete search history.

(56) References Cited

U.S. PATENT DOCUMENTS

2024/0202679 A1* 6/2024 Mayerchak ........ G06Q 20/0658

FOREIGN PATENT DOCUMENTS

WO  WO-2023159203 A2 *  8/2023

OTHER PUBLICATIONS

Lee et al. "SoK: Not Quite Water Under the Bridge: Review of Cross-Chain Bridge Hacks", arXiv:2210.16209v1, Oct. 31, 2022, 37 pages (Year: 2022).*

(Continued)

*Primary Examiner* — James D Nigh
(74) *Attorney, Agent, or Firm* — Weiss & Arons LLP

(57) ABSTRACT

Systems and methods for securing a cryptocurrency asset transfer via a cross-blockchain bridge. Methods may include detecting a request to transfer the asset between blockchains and extracting a set of features such as smart contract bytecode from event logs associated with the blockchains and a blockchain bridge. Methods may include using a photonic quantum processor to use i) a long short-term neural network and ii) a neural network to generate machine learning models based on the extracted features to output i) a security risk threshold and ii) a security risk percentage, respectively. When the security risk percentage is below the security risk threshold, the method may permit the execution of a smart contract to allow transfer of the cryptocurrency asset over the blockchain bridge. When the security risk percentage is above the security risk threshold, the method may involve blocking an execution of a smart contract on the blockchain bridge.

14 Claims, 6 Drawing Sheets

(56) References Cited

OTHER PUBLICATIONS

Pillai et al. "Cross-Blockchain Technology: Integration Framework and Security Assumptions", IEEE Access vol. 10, 2022 published Apr. 13, 2022, pp. 41239-41259 (Year: 2022).*

Alvaro Ballon, "Photonic Quantum Computers," https://pennylane.ai/qml/demos/tutorial_photonics, Xanadu, May 31, 2022. www.xanadu.ai Retrieved on Jan. 9, 2023.

* cited by examiner

SECURE CROSS-BLOCKCHAIN ASSET MOVEMENT USING PHOTONIC QUANTUM COMPUTING

FIELD OF TECHNOLOGY

This disclosure relates to blockchain bridges.

BACKGROUND OF THE DISCLOSURE

Currently, in many countries such as the United States of America, cryptocurrency is not organized under the auspices of a government or banking institution. As cryptocurrency becomes more accepted, governments and banking institutions may embrace cryptocurrency and provide more organization.

As cryptocurrency becomes more popular, opportunities for foul play may also increase. Two such examples are fraud and money laundering.

Fraud, like with traditional banking, may involve theft of money, through theft of cryptocurrency. Money laundering, like with traditional banking, may involve taking illicitly obtained funds and repurposing them in a way that loses any trace of their original source.

Cryptocurrency presents a unique challenge for both areas. The ability to recover losses in cryptocurrency fraud may have disadvantages over fraud recovery in traditional banking. When one is the victim of cryptocurrency fraud, recovering the lost cryptocurrency may be difficult or impossible. Further, with the lack of organization, there is no central authority with whom to lodge a claim. Even with organization, it is not clear what kind of recovery may be possible. Similarly, preventing money laundering may be difficult or impossible. Keeping track of all the nodes cryptocurrency crosses as it travels from a grantor to a receiver may be a challenging task.

Movement of cryptocurrency from one blockchain to another may present challenges. Securing cross-blockchain asset movement and obtaining insight into the path of travel of blockchain assets across blockchains will only become more important as blockchain popularity increases.

It would be desirable, therefore, to provide systems and methods for securing cryptocurrency asset transfer across blockchains.

SUMMARY OF THE DISCLOSURE

Apparatus and methods are herein provided to meet the above outlined objectives of the invention. Aspects of the disclosure may relate to apparatus and methods for securing a cryptocurrency transfer via a cross-blockchain bridge.

Methods may include securing a cryptocurrency transfer via a cross-blockchain bridge. Methods may include detecting a request to transfer a cryptocurrency asset between a first node in a first blockchain and a second node in a second blockchain.

Methods may further include extracting a set of features from a blockchain event log associated with the blockchain. The set of extracted features may include smart contract bytecode associated with the blockchain event log.

Methods may further include extracting a set of features from a blockchain bridge event log associated with a blockchain bridge. The set of extracted features may include smart contract bytecode associated with the blockchain bridge event log.

Methods may include using a photonic quantum processor. At the photonic quantum processor, methods may include using a long short-term neural network to generate a machine learning model based at least in part on the sets of extracted features from multiple blockchains and at least one connecting blockchain bridge. The machine learning model generated using the long short-term neural network may output a security risk threshold associated with the request to transfer the cryptocurrency asset.

Methods may include using a photonic quantum processor. At the photonic quantum processor, methods may include using a neural network to generate a machine learning model based at least in part on the sets of extracted features from multiple blockchains and at least one connecting blockchain bridge. The machine learning model may include a transfer profile knowledge graph. The transfer profile knowledge graph may output a security risk percentage associated with the request to transfer the cryptocurrency asset.

The method may utilize the security risk threshold and security risk percentage outputs from the long short-term neural network and the second neural network. When the security risk percentage is below the security risk threshold, the method may permit the execution of a smart contract on the blockchain bridge. The method may include burning the first cryptocurrency token associated with the cryptocurrency asset at the first node in the first blockchain. The method may include minting the second cryptocurrency token associated with the cryptocurrency asset at the second node in the second blockchain.

When the security risk percentage is above the security risk threshold, the method may involve blocking an execution of a smart contract on the blockchain bridge.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
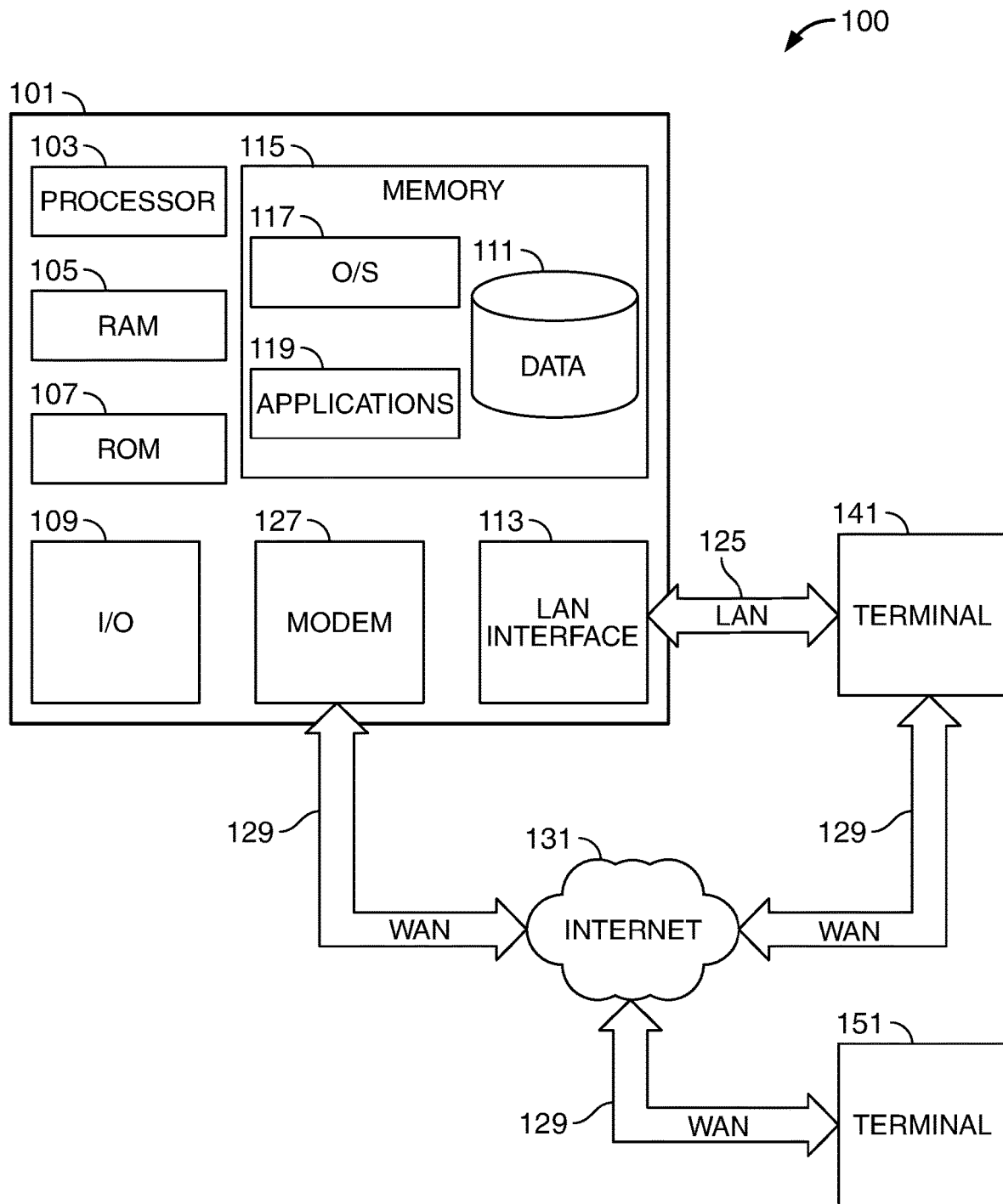
FIG. 1 shows an illustrative block diagram in accordance with principles of the disclosure.

Aspects of the disclosure provided herein may relate to apparatus and methods for securing a cryptocurrency transfer via a cross-blockchain bridge. Also provided herein are systems and methods for preventing or minimizing the risk of fraud with the transfer of cryptocurrency. Further provided herein are systems and methods for preventing or minimizing the ability to launder funds using cryptocurrency. The apparatus and methods are illustrated in FIGS. 1 to 4, 5A, and 5B, as described herein.

Cryptocurrency created and transferred within a blockchain using a distributed ledger smart contract may provide a secure method for transferring assets between parties. The security may be due, in part, to a blockchain having its own dedicated distributed ledger smart contract. Members of the blockchain may monitor cryptocurrency transactions recorded in the blockchain for anomalies that may raise concerns of fraud. A party detecting concerning behavior in the blockchain may warn other participants in the blockchains to avoid certain members whose behavior may be concerning.

Parties on different blockchains who want to do business may require use of a blockchain bridge, otherwise known as a cross-chain bridge or cross-blockchain bridge. Such a bridge may connect two blockchain networks and allow users to send cryptocurrency from one network to the other network. Each network may have its own cryptocurrency and dockets. For example, the Ethereum network has the Ether cryptocurrency. The Bitcoin network has the Bitcoin cryptocurrency. A party owning Bitcoin cryptocurrency may use a cross blockchain bridge to engage in commerce with a party owning Ether cryptocurrency.

Cross blockchain bridges may provide a valuable tool in connecting different blockchains, expanding interconnectivity within the cybercurrency community. However, a weak point may exist as one cybercurrency is converted to another. A cross blockchain bridge may provide a weak point for fraudsters to intercept transfer of cryptocurrency. A cross blockchain bridge typically involves locking or burning tokens on the source chain through a smart contract and unlocking or minting tokens through another smart contract on the destination chain. For example, a cross blockchain bridge may have its own distributed ledger smart contract. This smart contract may be a public smart contract. The cross blockchain bridge may record a cryptocurrency exchange where one party went down in its balance while another party went up. The smart contract for the cross blockchain bridge may record the transaction. The smart contract may be a source. Since members of different blockchains may use the same distributed ledger smart contract, detecting anomalies may be more difficult. For example, members of the different blockchain may have less awareness of the patterns of cryptocurrency use of the members of the other blockchain. Further, a public smart contract may be readable to an outside party, such as a hacker, possessing an enabling computer application. If a hacker has also obtained a user identification and password of an administrator, the hacker may access and alter rules in a smart contract.

To prevent fraud, it may be necessary to have a system and a method to detect fraudulent patterns in the users of the blockchain. Artificial intelligence tools such as those utilizing machine learning may offer a way to detect fraudulent patterns. However, applying artificial intelligence and machine learning tools to cross blockchain bridge distributed ledger smart contracts may require high computational power. This may be due, in part, to many nodes involved in the transfer and to the high speed in which cryptocurrency transactions may occur. As cryptocurrency transactions progress, it may be advantageous to have a tool and method that can even more quickly ascertain a fraud risk before completion of a cryptocurrency transaction. Detection before a cryptocurrency transfer is completed, for example, in real-time, may facilitate remedies not available when detecting fraud after the transfer of the cryptocurrency.

Described herein are systems and methods that may operate quickly, such as in real-time, to secure cryptocurrency asset transfer across a blockchain bridge by detecting cryptocurrency concerns before completion of a transaction. Photonic quantum computing is a tool that may enable rapid and high-power computing. Use of photonic quantum computing at cross blockchain bridges may enable detection of cryptocurrency concerns before completion of a transaction. Photonic quantum computing may enable use of artificial intelligence and machine learning tools that enable detection of cryptocurrency concerns before completion of a transaction. Examples of cryptocurrency concerns may include potentially fraudulent behavior and potential money laundering. High speed computing enabled by photonic quantum computing may provide information with enough speed to take preventative and precautionary measures to prevent fraud and avoid money laundering.

In one aspect, photonic quantum computing may utilize silicon-based qubits. Photonic quantum computing using qubits may offer advantages over current high-speed computing systems and methods. For example, photonic quantum computing may enable faster long short-term memory (LSTM) neural networks and deep learning modules such as knowledge graphs. Photonic quantum computing may, in part, achieve faster processing speeds through parallel processing. One or more computer processors on a network may run photonic quantum computing. Photonic quantum computing may process artificial intelligence, machine learning tools, and provide output to evaluate security risks present on a cross blockchain bridge. The output of photonic quantum computing may be alerts about potential fraud and money-laundering risks at a cross blockchain bridge.

When identifying a concern at a cross blockchain bridge, remedies available during early fraud risk detection may include, for example, blocking a transfer of the cryptocurrency to a recipient, blocking a transfer of the cryptocurrency to a next node during its transit from a transmitting party to a receiving party, requesting additional tokens, consent, and/or validation from the transmitting party the cryptocurrency before completing the transmission, and sending an alert to the whole cryptocurrency blockchain or cryptocurrency exchange.

Rapid feedback during a cryptocurrency transaction enabled by photonic quantum computing may provide for money laundering detection and anti-money laundering (AML) compliance. The rapid feedback may be important to detect in real-time all the nodes participating in the validation of a cryptocurrency transfer. For example, one country may have AML laws passed against conducting commerce with another country. A cryptocurrency transaction may use nodes in both countries. Detecting the presence of both nodes in the distributed ledger smart contract and informing an appropriate party may be critical for the cryptocurrency transition to comply with any AML laws. When detecting a node in a banned country, that node can be avoided during a cryptocurrency originating or completing in the banning country, thereby following the AML laws of the banning country. Furthermore, when using photonic quantum computing to detect a troublesome node, computing speed may be rapid enough to take an appropriate action to minimize security risk or maximize compliance.

Methods may include securing a cryptocurrency transfer via a cross-blockchain bridge. Methods may include detecting a request to transfer a cryptocurrency asset between a first node in a first blockchain and a second node in a second blockchain.

Methods may further include extracting a set of features from a blockchain event log associated with the blockchain. The set of extracted features may include smart contract bytecode associated with the blockchain event log.

Methods may further include extracting a set of features from a blockchain bridge event log associated with a blockchain bridge. The set of extracted features may include smart contract bytecode associated with the blockchain bridge event log.

Methods may include using a photonic quantum processor. At the photonic quantum processor, methods may include using a long short-term neural network to generate a machine learning model based at least in part on the sets of extracted features from multiple blockchains and at least one connecting blockchain bridge. The machine learning model generated using the long short-term neural network may output a security risk threshold associated with the request to transfer the cryptocurrency asset.

Methods may include using a photonic quantum processor. At the photonic quantum processor, methods may include using a neural network to generate a machine learning model based at least in part on the sets of extracted features from multiple blockchains and at least one connecting blockchain bridge. The machine learning model may include a transfer profile knowledge graph. The transfer profile knowledge graph may output a security risk percentage associated with the request to transfer the cryptocurrency asset.

The method may utilize the security risk threshold and security risk percentage outputs from the long short-term neural network and the second neural network. When the security risk percentage is below the security risk threshold, the method may permit the execution of a smart contract on the blockchain bridge. The method may include burning the first cryptocurrency token associated with the cryptocurrency asset at the first node in the first blockchain. The method may include minting the second cryptocurrency token associated with the cryptocurrency asset at the second node in the second blockchain.

When the security risk percentage is above the security risk threshold, the method may involve blocking an execution of a smart contract on the blockchain bridge. The method may involve allowing the execution of the smart contract on the blockchain bridge after requesting and obtaining one or more additional tokens. The method may involve sending out a notification to the nodes connected to the blockchains and blockchain bridge about a potential concern.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. One may refer to Computer 101 as an "engine," "server" or "computing device." Computer 101 may be a workstation, desktop, laptop, tablet, smart phone, or any other suitable computing device. One may use elements of system 100, including computer 101, to implement various aspects of the systems and methods disclosed herein.

Computer 101 may have processor 103 for controlling operation of the device and its associated components, and may include RAM 105, ROM 107, input/output module 109, and non-transitory/non-volatile machine-readable/writeable memory 115. One may configure machine-readable/writeable memory to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may be comprised of any suitable permanent storage technology—e.g., a hard drive. Memory 115 may store software including operating system 117 and application program(s) 119 along with any data 111 needed for operation of system 100. Memory 115 may also store videos, text, and/or audio assistance files. One may store data in memory 115, in cache memory, or in any other suitable memory.

Input/output ("I/O") module 109 may include connectivity to a microphone, keyboard, touch screen, mouse, and/or stylus. One may provide input into computer 101 through these I/O modules. The input may include input relating to cursor movement. I/O 109 may also include one or more speakers for providing audio output and a video display device for providing textual, audio, audiovisual, and/or graphical output. The input and/or output may be related to computer application functionality.

One may connect System 100 to other systems via local area network (LAN) interface (or adapter) 113. System 100 may operate in a networked environment supporting connections to one or more remote computers, such as terminals 141 and 151. Terminals 141 and 151 may be personal computers or servers that include many or all the elements described above relative to system 100. Network connections depicted in FIG. 1 include a local area network (LAN) 125 and a wide area network (WAN) 129 but may also include other networks. One may connect computer 101 to LAN 125 through LAN interface (or adapter) 113 when using a LAN networking environment. When used in a WAN networking environment, computer 101 may include modem 127 or other means for establishing communications over WAN 129, such as Internet 131.

One appreciates that the network connections shown are illustrative. One may use other means of establishing a communications link between computers. One may presume the existence of various well-known protocols such as TCP/IP, Ethernet, FTP, HTTP, and the like. One may operate the system in a client-server configuration to permit retrieval of data from a web-based server or application programming interface (API). One may understand that web-based, for this application, includes a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, one may use application program(s) 119 on computer 101. These programs may include computer executable instructions for invoking functionality related to communication, such as e-mail, Short Message Service (SMS), and voice input and speech recognition applications. One may refer to application program(s) 119 (alternatively, "plugins," "applications," or "apps") to include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of calls received from calling sources as detailed herein.

Application program(s) 119 may include computer executable instructions (alternatively referred to as "programs"). Embodied in hardware or firmware (not shown) may be the computer executable instructions. Computer 101 may execute the instructions embodied by the application program(s) 119 to perform various functions.

Application program(s) 119 may utilize the computer-executable instructions executed by a processor. Programs include routines, programs, objects, components, data structures, etc. that perform tasks or implement abstract data types. A computing system may be operational with distributed computing environments. Remote processing may perform tasks on devices linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Stored in memory 115 is any information described above in connection with database 111, and any other suitable information. One or more of application program(s) 119 may include one or more algorithms used to add data and metadata to a database, identify a type of form being used, predict fields in a document, identify changes between documents, provide changes to an entity to ascertain if an error is present, identify fraud concerns, communicate fraud concerns to interested parties within an organization, and provide documents for providing to a regulatory authority.

One may describe the invention in the context of computer-executable instructions, such as application program(s) 119, for execution by a computer. Programs may include routines, programs, objects, components, and data structures, which perform tasks or implement data types. One may practice the invention in distributed computing environments. One may perform tasks by remote processing devices, linked through a communications network. In a distributed computing environment, programs may be in both local and remote computer storage media including memory storage devices. One may consider such programs, for this application's purposes, as engines for the performance of the program-assigned tasks.

Computer 101 and/or terminals 141 and 151 may also include various other components, such as a battery, speaker, and/or antennas (not shown). One may link components of computer system 101 by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
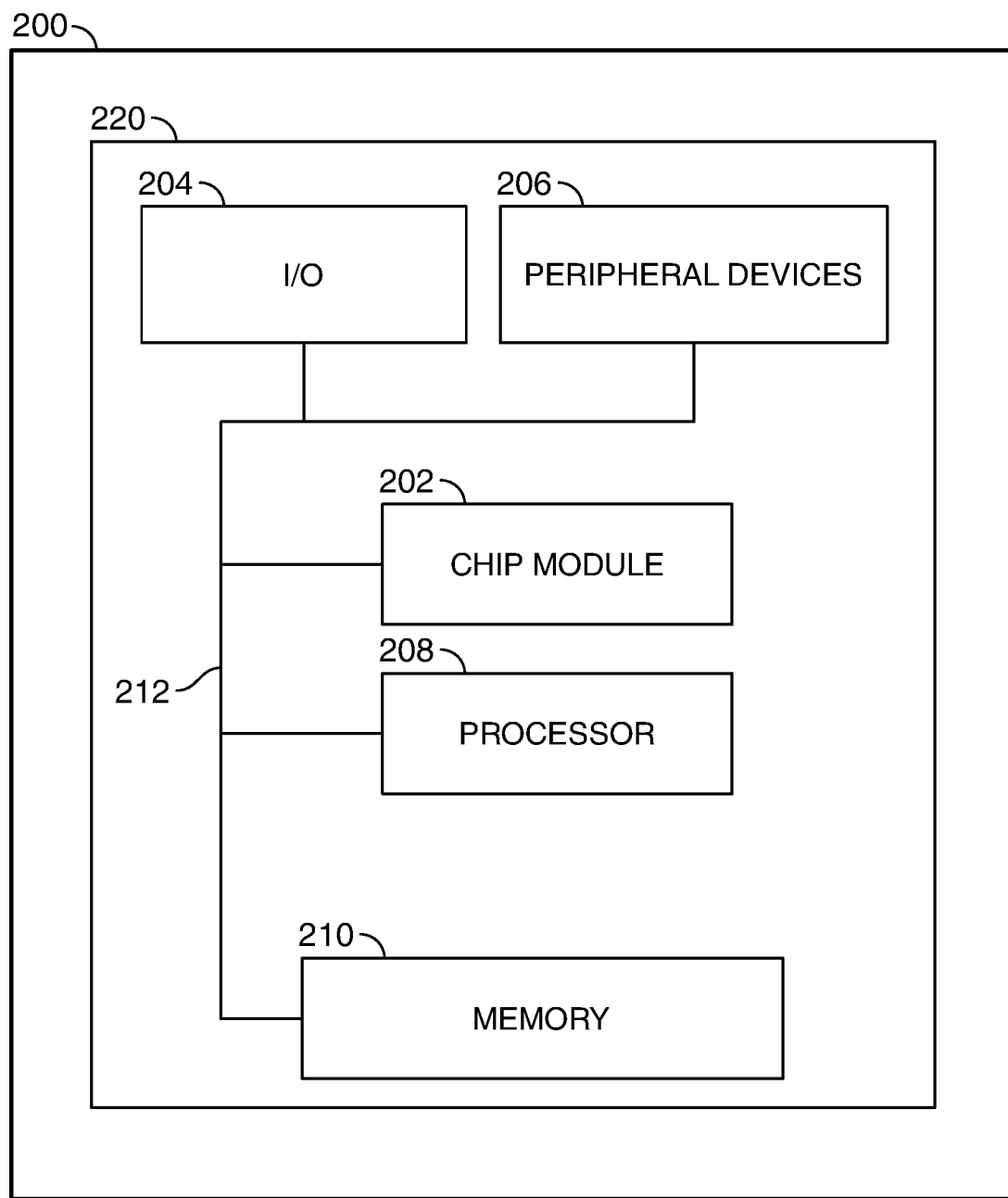
FIG. 2 shows an illustrative block diagram in accordance with principles of the disclosure.

FIG. 2 shows an illustrative block diagram of apparatus 200. One may configure apparatus 200 in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real time timers, power-on reset generators or any other suitable peripheral devices; logical processing device 208, which may compute data structural information and structural parameters of data; and machine-readable/writeable memory 210.

One may configure machine-readable/writeable memory 210 to store information in machine-readable/writeable data structures, such as: machine executable instructions (for example, "computer instructions" or "computer code"); applications, signals; and/or any other suitable information or data structures.

One may couple together components 202, 204, 206, 208 and 210 by system bus (or other interconnections) 212 and may be present on one or more than one circuit board 220. In some embodiments, the components may be integrated into a single chip. The chip may be silicon-based.

Figure 3:
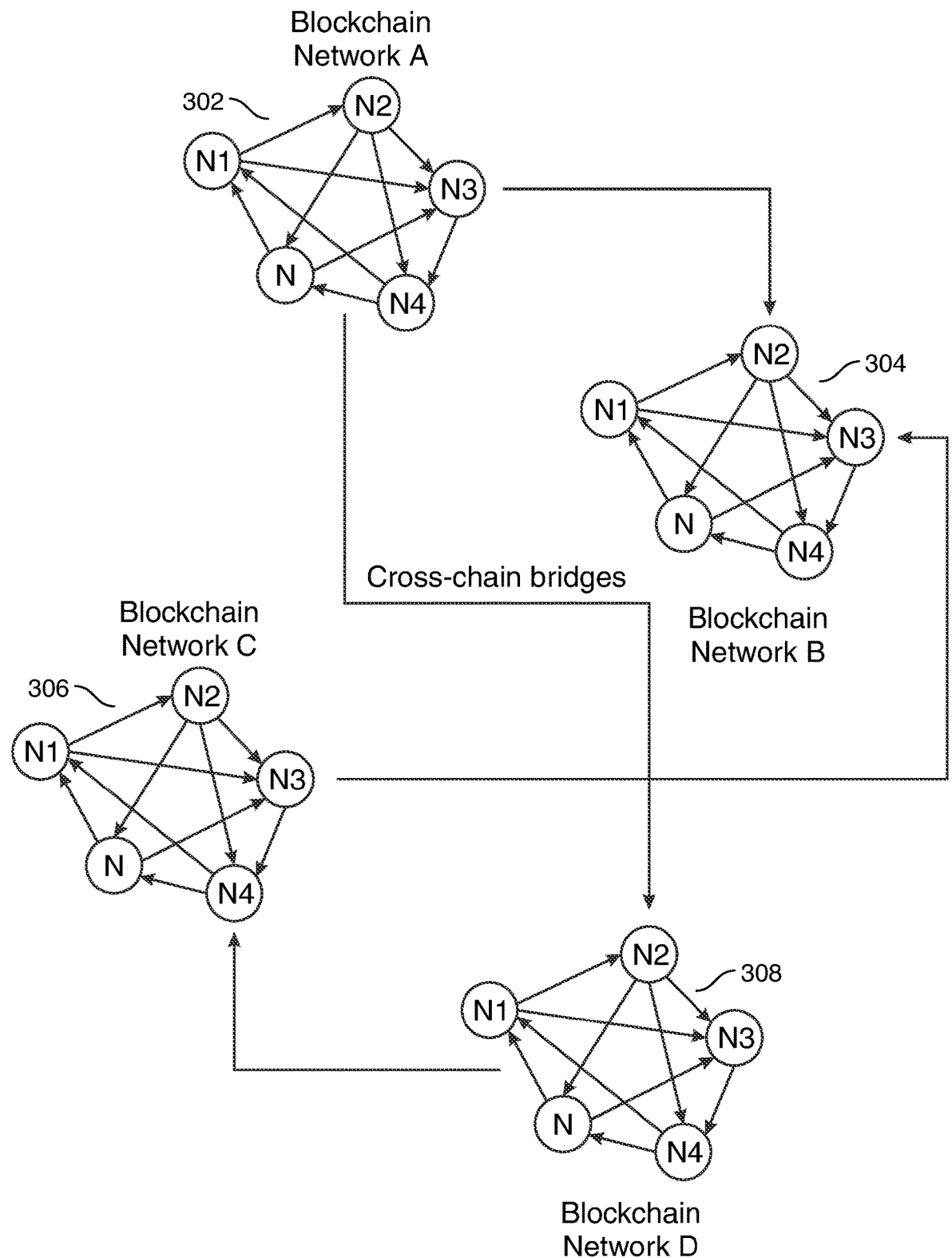
FIG. 3 shows an illustrative block diagram in accordance with principles of the disclosure.

FIG. 3 shows an illustrative flow diagram. Blockchain network A, 302, contains five nodes, N, N1, N2, N3, and N4. Blockchain network B, 304, Blockchain network C, 306, and Blockchain network D, 308, each also contain five nodes, N, N1, N2, N3, and N4. Blockchain network A is connected to Blockchain network B and Blockchain network D with separate cross blockchain bridges. Blockchain network B is connected to Blockchain network A and Blockchain network C with separate cross blockchain bridges. Blockchain network C is connected to Blockchain network B and Blockchain network D with separate cross blockchain bridges. Blockchain network D is connected to Blockchain network A and Blockchain network C with separate cross blockchain bridges.

Figure 4:
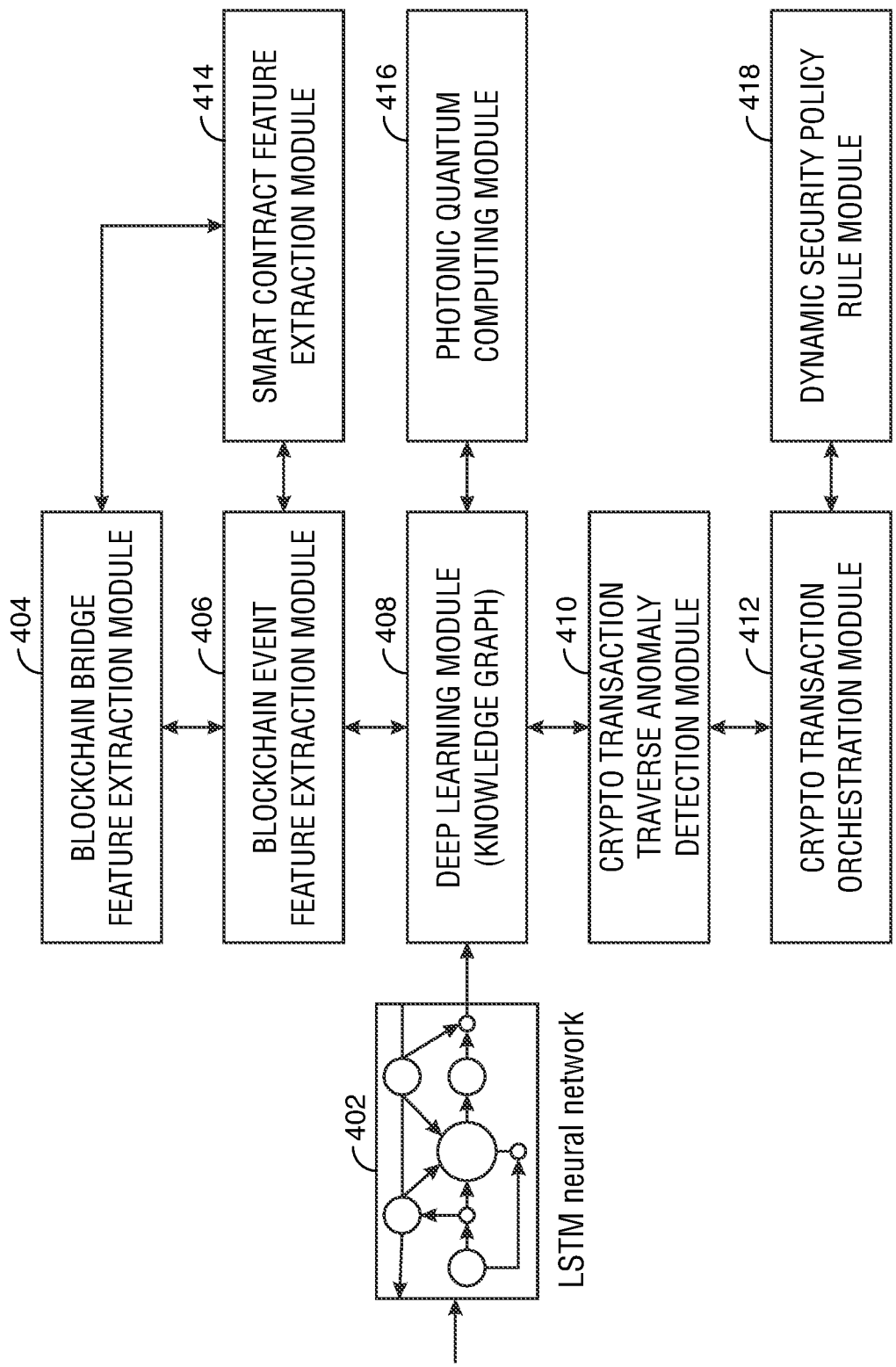
FIG. 4 shows an illustrative flowchart in accordance with principles of the disclosure.

FIG. 4 shows an illustrative flow diagram. The flow diagram may illustrate interconnections between architecture apparatus for monitoring and managing cross blockchain bridges. Various modules may work independently or inter-dependently. A cross blockchain bridge feature extraction module, 404, may interface with a blockchain event feature extraction module, 406, and a smart contract feature extraction module, 414. The cross blockchain bridge feature extraction model, 404, may extract information from cross blockchain bridges, including data and metadata relating to the cross blockchain bridge. A blockchain event feature extraction module, 406, may interface with a cross blockchain bridge feature extraction module, 404, a smart contract feature extraction module, 414, and a deep learning module (knowledge graph), 408. The blockchain event feature extraction module, 406, may extract information from blockchain events, including data and metadata relating to the blockchain events. A smart contract feature extraction module, 414, may interface with a cross blockchain bridge feature extraction module, 404, and a blockchain event feature extraction module, 406. The smart contract feature extraction module, 414, may extract information from the smart contracts, including data and metadata relating to the smart contracts.

A deep learning module, also known as a knowledge graph, 408, may interface with a blockchain event feature extraction module, 406, and with a crypto transaction traverse anomaly detection module, 410. The deep learning module, 408, may interface with a photonic quantum computing module, 416. The photonic quantum computing module, 416, may enable the deep learning module (knowledge graph), 408, to operate at higher speeds, for example, at real-time speeds that allow for acting before completing a cryptocurrency transaction. Acting before completion of a cryptocurrency transaction provides the most flexibility when a potential fraud or money laundering scenario arises. The deep learning module, 408, may interface with a long short-term memory (LSTM) neural network, 402. The LSTM, 402, may enable understanding and interpreting current behavior by comparing current behavior to past behavior, for example, past behavior at a negative 1 time point (n=−1), or any other past time point. Anomalies and departures from past behavior may be flagged for investigation and action.

A crypto transaction traverse anomaly detection module, 410, may interface with deep learning module (knowledge graph), 408, and with a crypto transaction orchestration module, 412. The crypto transaction traverse anomaly detection module, 410, may detect anomalies identified during crypto transactions. A crypto transaction orchestration module, 410, may interface with a crypto transaction traverse anomaly detection module and with a dynamic security policy rule module. The crypto transaction orchestration module may orchestrate various nodes within a blockchain and interactions between different blockchains via cross blockchain bridges. A dynamic security policy rule module may interface with a crypto transaction orchestration module. The dynamic security policy rule module may monitor and enforce dynamic security policy rules within blockchains and between blockchain via cross blockchain bridges.

In Ethereum, when a transaction is mined, smart contracts may emit events and write logs to the blockchain that the frontend can then process. A cross blockchain bridge may typically involve locking or burning tokens on the source chain through a smart contract and unlocking or minting tokens through another smart contract on the destination chain. Cross-chain smart contracts may be decentralized applications that consist of separate smart contracts on different blockchain networks that intercommunicate to create a single unified application.

Figure 5A:
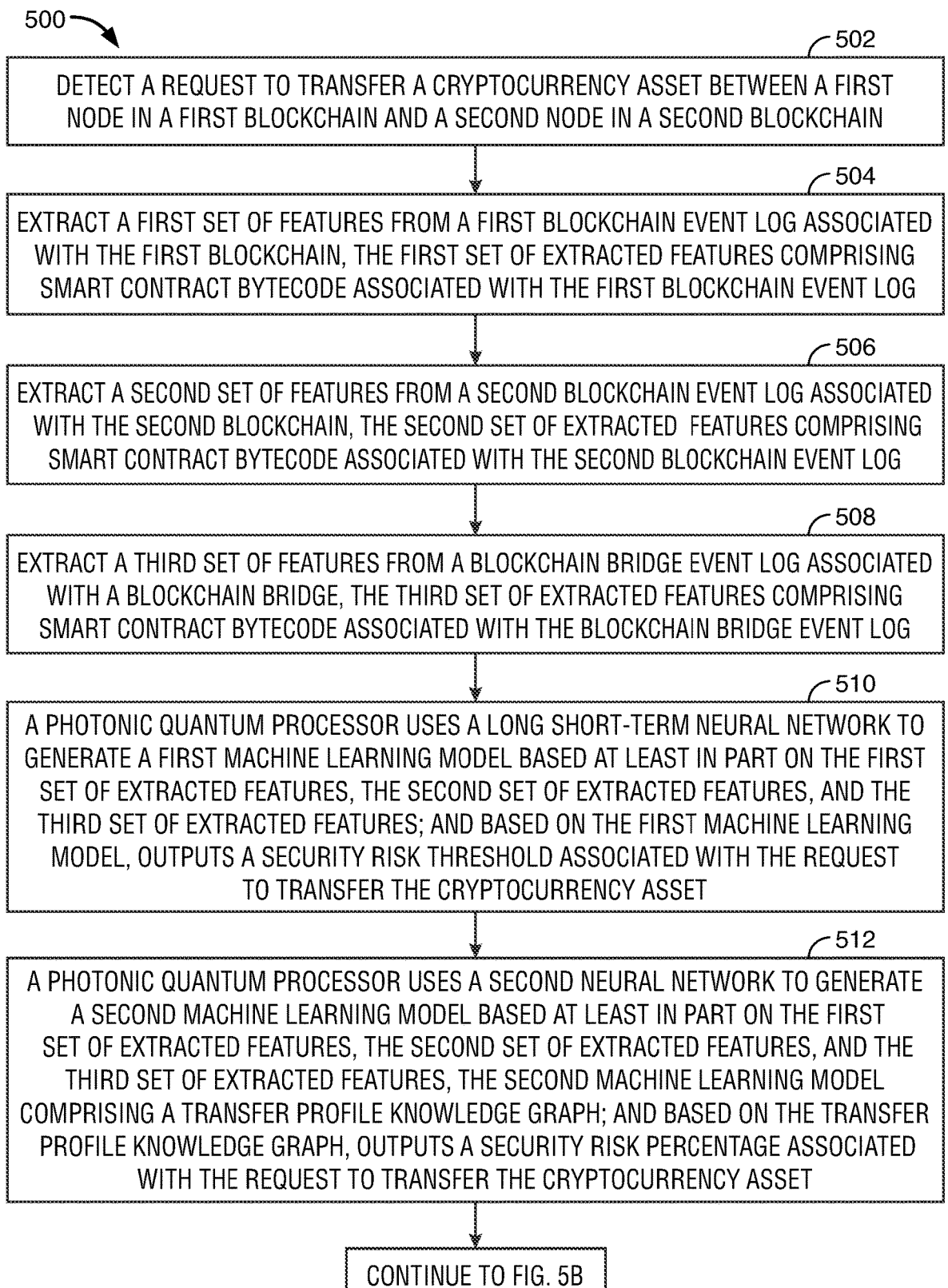
FIG. 5A shows an illustrative flowchart in accordance with principles of the disclosure.

FIG. 5a shows an illustrative flow chart 500. The process may start at 502 by detecting a request to transfer a cryptocurrency asset between a first node in a first blockchain and a second node in a second blockchain. At 504, the process may extract a first set of features from a first blockchain event log associated with the first blockchain, the first set of extracted features comprising smart contract bytecode associated with the first blockchain event log. At 506, the process may extract a second set of features from a second blockchain event log associated with the second blockchain, the second set of extracted features comprising smart contract bytecode associated with the second blockchain event log. At 508, the process may extract a third set of features from a blockchain bridge event log associated with a blockchain bridge, the third set of extracted features comprising smart contract bytecode associated with the blockchain bridge event log. At 510, a photonic quantum processor may use a long short-term neural network to generate a first machine learning model based at least in part on the first set of extracted features, the second set of extracted features, and the third set of extracted features. Based on the first machine learning model, the photonic quantum processor may output a security risk threshold associated with the request to transfer the cryptocurrency asset. At 512, a photonic quantum processor may use a second neural network to generate a second machine learning model based at least in part on the first set of extracted features, the second set of extracted features, and the third set of extracted features. The second machine learning model may include a transfer profile knowledge graph. Based on the transfer profile knowledge graph, the second machine learning model may output a security risk percentage associated with the request to transfer the cryptocurrency asset. The method may continue with FIG. 5b.

Figure 5B:
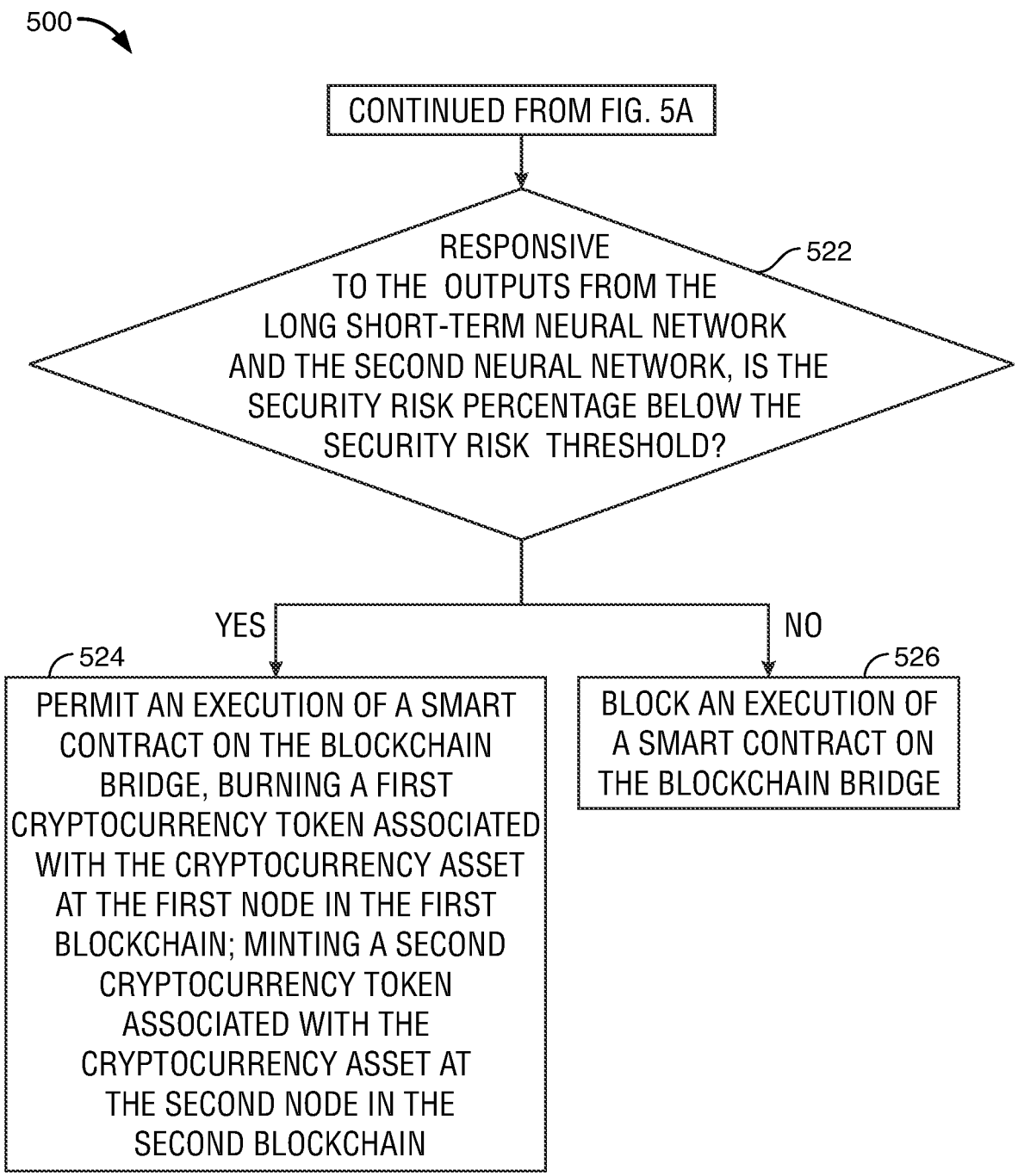
FIG. 5B shows an illustrative flowchart in accordance with principles of the disclosure.

In FIG. 5b, the process may continue at step 522. At 522, responsive to the outputs from the long short-term neural network and the second neural network, the method may determine if the security risk percentage is below the security risk threshold. At 524, when the security risk percentage is below the security risk threshold, the method may permit execution of a smart contract on the blockchain bridge. An example of the execution of the smart contact may include burning a first cryptocurrency token associated with the cryptocurrency asset at the first node in the first blockchain and minting a second cryptocurrency token associated with the cryptocurrency asset at the second node in the second blockchain. At 526, when the security risk percentage is above the security risk threshold, the method may permit blocking the execution of the smart contract on the blockchain bridge.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, provided are methods and systems for securing cryptocurrency transfer via a cross-blockchain bridge. Persons skilled in the art will appreciate that the present invention can be practiced by other than the described embodiments, which are presented for purposes of illustration rather than of limitation, and that the present invention is limited only by the claims that follow.

What is claimed is:

1. A method for securing a cryptocurrency transfer via a cross-blockchain bridge, the method comprising:
    detecting a request to transfer a cryptocurrency asset between a first node in a first blockchain and a second node in a second blockchain;
    extracting a first set of features from a first blockchain event log associated with the first blockchain, the first set of extracted features comprising smart contract bytecode associated with the first blockchain event log;
    extracting a second set of features from a second blockchain event log associated with the second blockchain, the second set of extracted features comprising smart contract bytecode associated with the second blockchain event log;
    extracting a third set of features from a blockchain bridge event log associated with a blockchain bridge, the third set of extracted features comprising smart contract bytecode associated with the blockchain bridge event log;
    at a photonic quantum processor:
        using a long short-term neural network, generating a first machine learning model based at least in part on the first set of extracted features, the second set of extracted features, and the third set of extracted features;
        based on the first machine learning model, outputting a security risk threshold associated with the request to transfer the cryptocurrency asset;
    at the photonic quantum processor:
        using a second neural network, generating a second machine learning model based at least in part on the first set of extracted features, the second set of extracted features, and the third set of extracted features, the second machine learning model comprising a transfer profile knowledge graph;
        based on the transfer profile knowledge graph, outputting a security risk percentage associated with the request to transfer the cryptocurrency asset;
    in response to the outputs from the long short-term neural network and the second neural network:
        when the security risk percentage is below the security risk threshold, permitting an execution of a smart contract on the blockchain bridge, the executing comprising:
            burning a first cryptocurrency token associated with the cryptocurrency asset at the first node in the first blockchain;
            minting a second cryptocurrency token associated with the cryptocurrency asset at the second node in the second blockchain;
        when the security risk percentage is above the security risk threshold, blocking an execution of a smart contract on the blockchain bridge.

2. The method of claim 1, when the security risk percentage is above the security risk threshold, further comprising sending out an alert notification to the nodes in the first blockchain.

3. The method of claim 1, when the security risk percentage is above the security risk threshold, further comprising sending out an alert notification to the nodes in the second blockchain.

4. The method of claim 1, when the security risk percentage is above the security risk threshold, further comprising sending out an alert notification to the nodes in the first blockchain and the second blockchain.

5. The method of claim 1, when the security risk percentage is above the security risk threshold, further comprising sending out an alert notification to the nodes in the blockchain bridge.

6. A method for securing a cryptocurrency transfer via a cross-blockchain bridge, the method comprising:
    detecting a request to transfer a cryptocurrency asset between a first node in a first blockchain and a second node in a second blockchain;
    extracting a first set of features from a first blockchain event log associated with the first blockchain, the first set of extracted features comprising smart contract bytecode associated with the first blockchain event log;
    extracting a second set of features from a second blockchain event log associated with the second blockchain, the second set of extracted features comprising smart contract bytecode associated with the second blockchain event log;
    extracting a third set of features from a blockchain bridge event log associated with a blockchain bridge, the third set of extracted features comprising smart contract bytecode associated with the blockchain bridge event log;
    at a photonic quantum processor:
        using a long short-term neural network, generating a first machine learning model based at least in part on the first set of extracted features, the second set of extracted features, and the third set of extracted features;
        based on the first machine learning model, outputting a security risk threshold associated with the request to transfer the cryptocurrency asset;
    at the photonic quantum processor:
        using a second neural network, generating a second machine learning model based at least in part on the first set of extracted features, the second set of extracted features, and the third set of extracted features, the second machine learning model comprising a transfer profile knowledge graph;
        based on the transfer profile knowledge graph, outputting a security risk percentage associated with the request to transfer the cryptocurrency asset;
    in response to the outputs from the long short-term neural network and the second neural network:
        when the security risk percentage is below the security risk threshold, permitting an execution of a smart contract on the blockchain bridge, the executing comprising:
            burning a first cryptocurrency token associated with the cryptocurrency asset at the first node in the first blockchain;
            minting a second cryptocurrency token associated with the cryptocurrency asset at the second node in the second blockchain;
        when the security risk percentage is above the security risk threshold, requesting one or more additional tokens to verify an authenticity of a transfer before executing the smart contract on the blockchain bridge.

7. The method of claim 6, wherein the additional tokens are received from the second node.

8. The method of claim 6, wherein the additional tokens are received from the first node.

9. The method of claim 6, wherein the additional tokens are received from the first node and the second node.

10. The method of claim 6, wherein the additional tokens are received from an entity related to the blockchain bridge.

11. The method of claim 6, when the security risk percentage is above the security risk threshold, further comprising sending out an alert notification to the nodes in the first blockchain.

12. The method of claim 6, when the security risk percentage is above the security risk threshold, further comprising sending out an alert notification to the nodes in the second blockchain.

13. The method of claim 6, when the security risk percentage is above the security risk threshold, further comprising sending out an alert notification to the nodes in the first blockchain and the second blockchain.

14. The method of claim 6, when the security risk percentage is above the security risk threshold, further comprising sending out an alert notification to the nodes in the blockchain bridge.

* * * * *